US012002382B2

(12) United States Patent
Hayes

(10) Patent No.: US 12,002,382 B2
(45) Date of Patent: Jun. 4, 2024

(54) PNEUMATIC FLAGPOLE

(71) Applicant: Air Flag International, LLC, Fort Wayne, IN (US)

(72) Inventor: Michael M. Hayes, Fort Wayne, IN (US)

(73) Assignee: Air Flag International, LLC, Fort Wayne, IN (US)

(*) Notice: Subject to any disclaimer, the term of this patent is extended or adjusted under 35 U.S.C. 154(b) by 0 days.

(21) Appl. No.: 17/464,676

(22) Filed: Sep. 2, 2021

(65) Prior Publication Data

US 2022/0068172 A1 Mar. 3, 2022

Related U.S. Application Data

(60) Provisional application No. 63/073,321, filed on Sep. 1, 2020.

(51) Int. Cl.
*G09F 17/00* (2006.01)

(52) U.S. Cl.
CPC ...... *G09F 17/00* (2013.01); *G09F 2017/0016* (2013.01)

(58) Field of Classification Search
CPC .. G09F 17/00; G09F 17/0016; G09F 17/0033; G09F 17/0091; G09F 2017/0016; G09F 2017/005
USPC ..................................... 40/218; 116/173–175
See application file for complete search history.

(56) References Cited

U.S. PATENT DOCUMENTS

| | | | | | |
|---|---|---|---|---|---|
| 1,660,341 | A | * | 2/1928 | Lapworth | A63H 33/40 362/124 |
| 1,725,250 | A | * | 8/1929 | Burgess | E04H 12/32 D11/166 |
| 2,270,753 | A | * | 1/1942 | Fikes | G09F 17/00 116/173 |
| 2,870,559 | A | | 1/1959 | Shaughnessy | |
| 3,477,161 | A | * | 11/1969 | Drexler | G09F 17/00 40/613 |
| 3,952,695 | A | | 4/1976 | Vollstedt | |
| 5,042,418 | A | | 8/1991 | Hoover et al. | |
| 5,096,022 | A | | 3/1992 | Bowers | |
| 5,398,638 | A | | 3/1995 | Bonk | |
| 5,427,050 | A | | 6/1995 | Horn | |
| 5,509,371 | A | | 4/1996 | Phillips | |

(Continued)

FOREIGN PATENT DOCUMENTS

| | | | |
|---|---|---|---|
| DE | 3939085 | A1 | 5/1991 |
| DE | 29513087 | U1 | 1/1996 |

(Continued)

*Primary Examiner* — Gary C Hoge
(74) *Attorney, Agent, or Firm* — Michael D. Smith

(57) ABSTRACT

A pneumatic flagpole to which a vertically oriented flag is selectively attachable, the flagpole including a vertically elongate wall surrounding an elongate interior space through which air flows vertically upward, the wall having an exterior wall surface over which is positioned a flag selectively attached to the flagpole; and wherein the wall is provided with a plurality of vertically spaced apertures, each of the apertures extending between the interior space and the exterior wall surface, the flag is positioned adjacent to the apertures, and is engaged by air expelled from the interior space through the apertures, whereby the flag is caused to fly.

5 Claims, 4 Drawing Sheets

(56) References Cited

U.S. PATENT DOCUMENTS

| | | | | |
|---|---|---|---|---|
| 5,826,535 | A * | 10/1998 | Shaw | G09F 17/00 40/212 |
| 6,086,448 | A | 7/2000 | Ibanez | |
| 6,622,649 | B1 | 9/2003 | Shaw | |
| 7,017,510 | B1 * | 3/2006 | Nair | G09F 17/00 116/173 |
| 7,432,820 | B1 | 10/2008 | Phan et al. | |
| 8,215,807 | B1 | 7/2012 | Brunesti | |
| 8,973,517 | B1 | 3/2015 | Bort | |
| 9,280,922 | B1 * | 3/2016 | Chery | G09F 27/007 |
| 10,885,817 | B2 * | 1/2021 | Duncan | E04H 12/32 |
| 2008/0156252 | A1 * | 7/2008 | Al-Tawarh | G09F 17/00 116/174 |
| 2009/0019740 | A1 * | 1/2009 | Yebenes De Madrid, Jr. | G09F 17/00 116/173 |
| 2011/0094133 | A1 | 4/2011 | Amalaha | |
| 2018/0223872 | A1 * | 8/2018 | Moore | F04D 19/024 |
| 2019/0311660 | A1 * | 10/2019 | Duncan | G09F 17/00 |

FOREIGN PATENT DOCUMENTS

| | | | |
|---|---|---|---|
| KR | 100510214 | B1 | 8/2005 |
| WO | 2006099806 | A1 | 9/2006 |

* cited by examiner

PNEUMATIC FLAGPOLE

PRIORITY CLAIM AND CROSS-REFERENCE TO RELATED APPLICATION(S)

This application claims priority to U.S. Provisional Patent Application Ser. No. 63/073,321 filed Sep. 1, 2020, the disclosure of which in its entirety is incorporated herein by reference.

BACKGROUND

1. Field of the Invention

The present invention relates to relates to flagpoles, particularly flagpoles that are hollow or of substantially tubular construction and which are configured for attachment of a flag, pennant or banner thereto.

SUMMARY

The present invention provides a pneumatic flagpole to which a vertically oriented flag is selectively attachable. The flagpole includes a vertically elongate wall surrounding an elongate interior space through which air flows vertically upward. The wall has an exterior wall surface over which is positioned a flag selectively attached to the flagpole. The wall is provided with a plurality of vertically spaced apertures, each of the apertures extending between the interior space and the exterior wall surface. The flag is positioned adjacent to the apertures, and is engaged by air expelled from the interior space through the apertures, whereby the flag is caused to fly.

BRIEF DESCRIPTION OF THE DRAWINGS

The various objects, features and attendant advantages of the present invention will become fully appreciated as the same becomes better understood when considered in conjunction with the accompanying drawings. Although the drawings represent embodiments of the disclosed apparatus, the drawings are not, necessarily to scale or to the same scale and certain features may be exaggerated or omitted in order to better illustrate and explain, the present disclosure. Moreover, in accompanying drawings that show sectional views, cross-hatching of various sectional elements may have been omitted. It is to be understood that this omission of cross-hatching is for the purpose of clarity in illustration only.

Corresponding reference characters indicated corresponding parts throughout the several views.

DETAILED DESCRIPTION OF EXEMPLARY EMBODIMENT(S)

Figure 1:
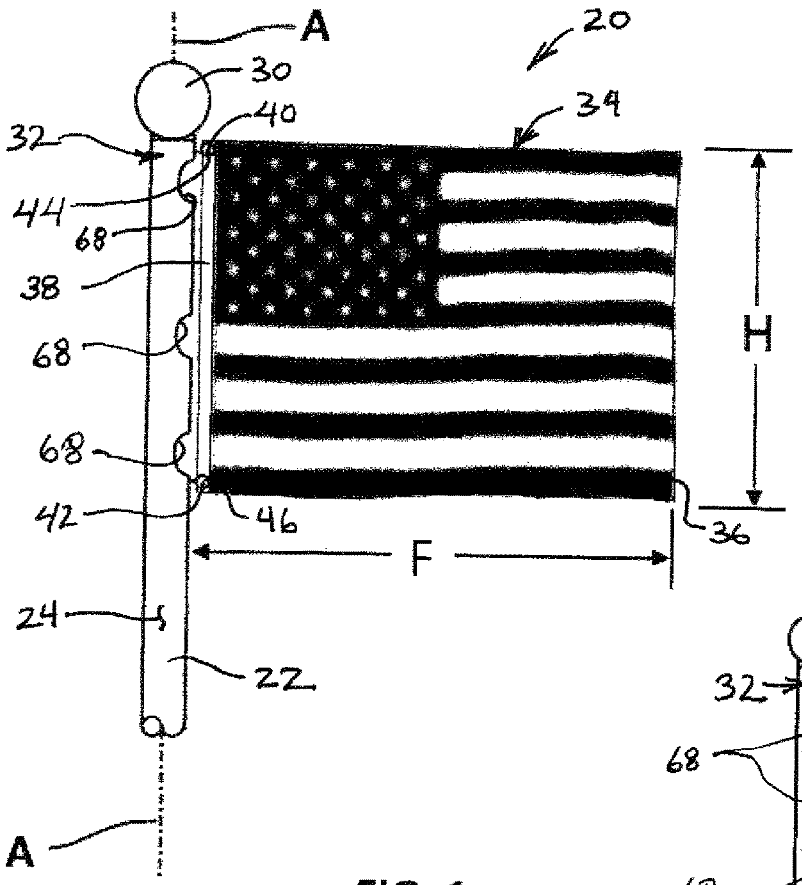
FIG. 1 is a fragmented side view of the upper portion of a first embodiment of a pneumatic flagpole according to the present invention, to which an example flag is attached at fixed locations.

The disclosed invention is adaptable to various modifications and alternative forms, and the specific embodiments thereof shown by way of example in the drawings, are herein described in detail. The exemplary embodiments of the present invention are chosen and described so that others skilled in the art may appreciate and understand the principles and practices of the present invention. It should be understood, however, that the drawings and detailed description are not intended to limit the invention, to the particular forms disclosed, but on the contrary, the intention is to cover all modifications, equivalents and alternatives falling within the spirit and scope of the present invention as defined by the appended claims. In the following description, "vertical" and "horizontal," "top" and "bottom," and "upper" and "lower" refer to directions, orientations and positions relative to an inventive flagpole as installed and/or a flag attached thereto as described herein.

As installed, longitudinal, pneumatic flagpole 20 extends vertically, as shown in the Figures. Various embodiments of flagpole 20 according to the present invention include substantially rigid, elongate pole portion 22. Pole portion 22 has a substantially cylindrical wall 23 that extends longitudinally along its linear central axis A. Herein, axial, radial and circumferential directions, orientations and positions are relative to central axis A unless indicated otherwise. In certain embodiments, a segment of substantially cylindrical pole portion 22 that terminates at its top end is tapered in the manner common to many prior flagpoles. Pole portion 22 may, for example, be a pipe or tube made of steel, stainless steel, aluminum, or schedule 40 PVC. Optionally, the exterior wall surface 24 of pole portion 22 may be painted, polished, brushed, coated or stained, to provide any of a variety of colors and finishes that are typical of prior flagpoles or that may be desired. Flagpole 20 as erected is structurally stable, and certain embodiments may be solidly affixed by known means to the ground or a floor, a building or a pedestal. In some installations, the bottom terminal end of pole portion 22 is slidably received into and supported by a ground sleeve (not shown) that is inserted into the ground. The ground sleeve is oftentimes encased in a surrounding concrete foundation located below ground level.

Tubular pole portion 22 has hollow, elongate interior space 26 located between its axially opposite ends. In some embodiments, interior space 26 is defined by interior wall surface 28 of pole portion 22, which in certain embodiments renders portions of interior space 26 generally cylindrical, as depicted in the Figures. As shown, some embodiments of flagpole 20 include finial 30, which may be in the form of, for example, a ball (as shown), an eagle, or other ornament that is attached to top end 32 of pole portion 22. In the depicted embodiments, the upper, terminal end of interior space 26 is substantially sealed, and in certain embodiments of flagpole 20, the upper, terminal end of interior space 26 is at least partially sealed by the attachment of finial 30 at pole portion top end 32.

As described further below, pressurized air continually supplied to interior space 26 is expelled therefrom via a plurality of apertures provided in pole portion 22. A flag is attached to flagpole 20 in proximity to these apertures, whereby airflow streams emitted from interior space 26 through the apertures flow onto or over the attached flag, causing the flag to fly as it would under the influence of a natural breeze.

Referring to FIG. 1, attached flag, banner or sign 34 (hereinafter generally referred to as flag 34), which may or may not be substantially rectangular as shown, has fly end 36 which is ordinarily free or untethered when attached to a flagpole, and opposite hoist end 38 at which flag 34 is ordinarily attached to a flagpole. Attached flag 34 has fly dimension F and hoist dimension H which are in substantially horizontal and vertical directions, respectively.

Those having ordinary skill in the relevant art recognize that fly dimension F of attached flag 34 extends in a generally radial direction from the part of pole portion exterior wall surface 24 that is nearest, to flag hoist end 38. Fly dimension F includes the width of attached flag 34, which is the distance between fly end 36 and opposing hoist end 38. Hoist dimension H of attached flag 34 extends between the uppermost and lowermost edges of flag 34 at hoist end 38, which ordinarily corresponds to the flag height.

Flag hoist end 38 typically has reinforced border edging provided with a pair of flag attachment holes defined by annular, metal upper and lower grommets 40, 42. Upper and lower grommets 40, 42 are located near the opposite ends of hoist dimension H. Upper and lower grommets 40, 42 are respectively receivable of upper and lower snap hooks 44, 46 by which flag 34 is selectively attached to flagpole 20.

In certain embodiments of flagpole 20, snap hooks 44, 46 are affixed to the upper portion of pole portion 22, proximate its top end 32. In such embodiments, examples of which are shown in FIGS. 1 and 2, flag 34 is attached to flagpole 20 at fixed vertical and circumferential locations relative to pole portion 22.

Figure 2:
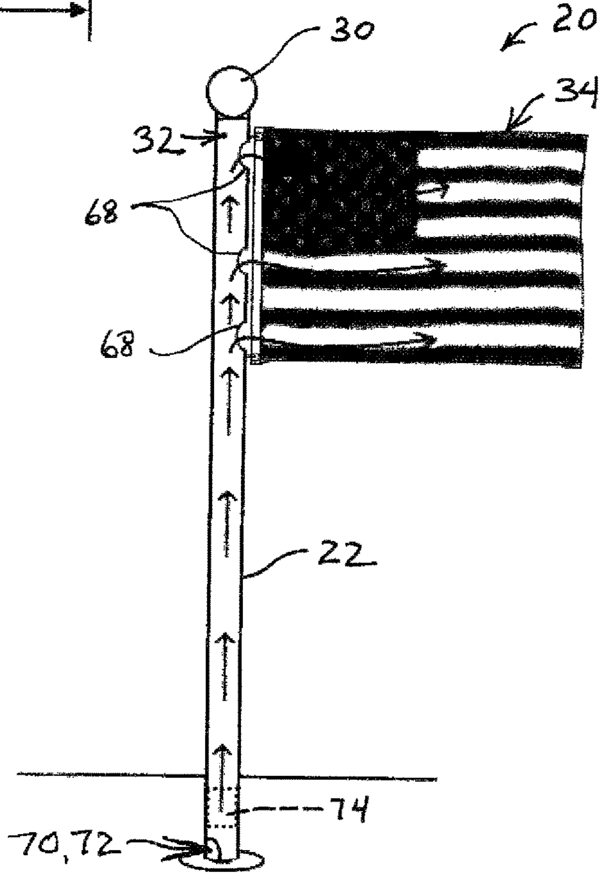
FIG. 2 is a side view of the pneumatic flagpole and flag of FIG. 1, also showing a schematically represented electric fan, and arrows indicating airflow along the interior space of the flagpole's pole portion, through exit orifices provided in the pole portion, and over the attached flag.

In the embodiments shown in FIGS. 1 and 2, snap hooks 44, 46 project radially outwardly from exterior wall surface 24 of pole portion 22. With flagpole 20 vertically oriented, snap hooks 44, 46 are vertically spaced and radially aligned relative to each other, thereby locating upper snap hook 44 directly above lower snap hook 46.

In other embodiments of flagpole 20, flag 34 is attached to upper and lower snap hooks 44, 46 that are themselves attached to a moveable halyard, a rope or cable that runs on a pulley rotatably attached to a truck that is mounted to the top end of the flagpole. The finials of some flagpoles are mounted to the trucks of their halyard systems.

The truck can be of a stationary type having a fixed position relative to axis A, which can prevent the halyard from becoming twisted about the pole portion and become difficult to operate; or the truck can be of a rotatable type able to move between different radial positions about axis A, which better accommodates flag flying with changing wind directions. The pulley over which the halyard rides defines the "peak" of a flagpole, i.e., the highest point to which a flag can be raised. Halyard systems allow an attached flag to be easily raised and lowered along a flagpole to positions of differing heights. The halyard is secured against further vertical movement when the flag reaches the vertical position desired.

Halyard systems are well-known in the relevant art and generally of either the internal type or the external type. Certain embodiments of flagpole 20, such as the embodiment shown in FIGS. 4 and 4A, include an internal halyard system. Flagpole 20 of this embodiment includes vertically-oriented pulley 50 over which halyard 48 rides. Pulley 50 of this embodiment is rotatably supported by truck 52 mounted to pole portion top end 32. In the depicted embodiment, truck 52 is rotatably mounted to pole portion top end 32 and is rotatable about central axis A of pole portion 22, as indicated by double-headed arrow 54. Finial 30 is positioned on axis A and attached to truck 52.

Internal halyard systems are characterized by the opposite terminal ends of halyard 48 not being attached to each other to form a continuous, or endless loop. Rather, truck pulley 50 on which halyard 48 rides is located between and defines halyard first and second segments 56, 58 located on opposite sides of pulley 50 and located externally and internally of pipe portion 22.

As one of halyard first segment 56 and halyard second segment 58 is vertically moved up or down, it is shortened or lengthened, respectively; that movement causes the other to reciprocate by moving in the opposite vertical direction and is respectively lengthened or shortened. Halyard first segment 56 extends to a first terminal end 60 of halyard 48, to which lower snap hook 46 is securely attached. Upper snap hook 44 is attached to halyard first segment 56 at a distance from lower snap hook 46 that is substantially equivalent to the spacing between upper and lower grommets 40, 42 of flag 34. Upper and lower grommets 40, 42 of flag 34 are respectively receivable of upper and lower snap hooks 44, 46.

Figure 4:
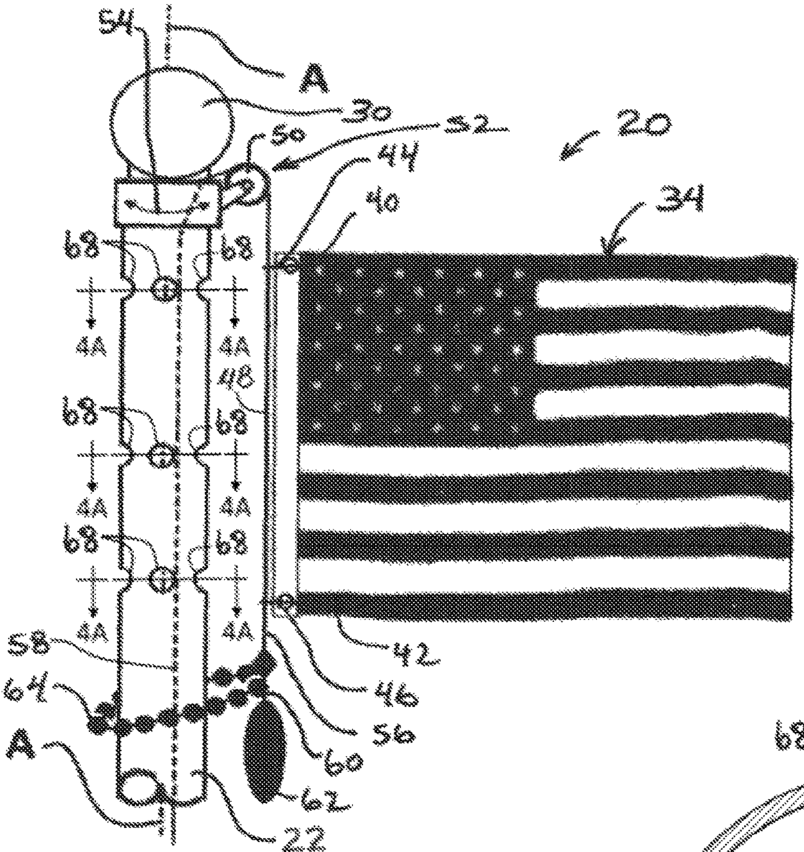
FIG. 4 is a fragmented view of the upper portion of a third embodiment of a pneumatic flagpole according to the present invention having an internal halyard system to which an example flag is attached, and a rotatable truck that supports the halyard at various radial positions about the longitudinal axis of the flagpole's pole portion.

As depicted in FIG. 4, in certain embodiments of flagpole 20 including an internal halyard system, halyard second segment 58 extends radially inward from pulley 50 and downward through an opening in truck 52, and into top end 32 of pole portion 22. In a manner well-known in the relevant art, halyard second segment 58 extends internally of pole portion 22, downward from pulley 50 to a cleat, cam or winch mechanism (not shown) with which halyard second segment 58 is engageable, and by which halyard 48 is held fast to hold attached flag 34 in the desired vertical position on the opposite side of pipe portion wall 23.

In certain embodiments of flagpole 20 including an internal halyard system, the abovementioned cleat, cam or winch mechanism is disposed within pole portion 22, and may be selectively accessed by an operator via a closeable access door or hatch (not shown) in wall 23 of pole portion 22.

According to certain embodiments of flagpole 20 including an internal halyard system, counterweight 62 is attached to halyard first segment 56 at first terminal end 60, proximate to lower snap hook 46, to keep halyard first segment 56 and hoist end 38 of attached flag 34 substantially plumb, and to help keep upper and lower snap hooks 44, 46 substantially radially aligned relative to axis A. In some embodiments of flagpole 20, beaded retainer sling 64, which encircles pole portion 22, is also attached to halyard first segment 56 at, or proximately below, lower snap hook 46, thereby retaining halyard first terminal end 60 and the lowermost end of the flag hoist end 38 to pole portion 22. Accordingly, flag 34 is selectively attached to embodiments of flagpole 20 including an internal halyard system.

In certain embodiments of flagpole 20 including an internal halyard system, halyard second segment 58 at least partially extends through interior space 26, which also contains the abovementioned cleat, cam or winch mechanism. In certain other such embodiments, interior space 26 is substantially out of fluid communication with halyard second segment 58 and the cleat, cam or winch mechanism.

Figure 5:
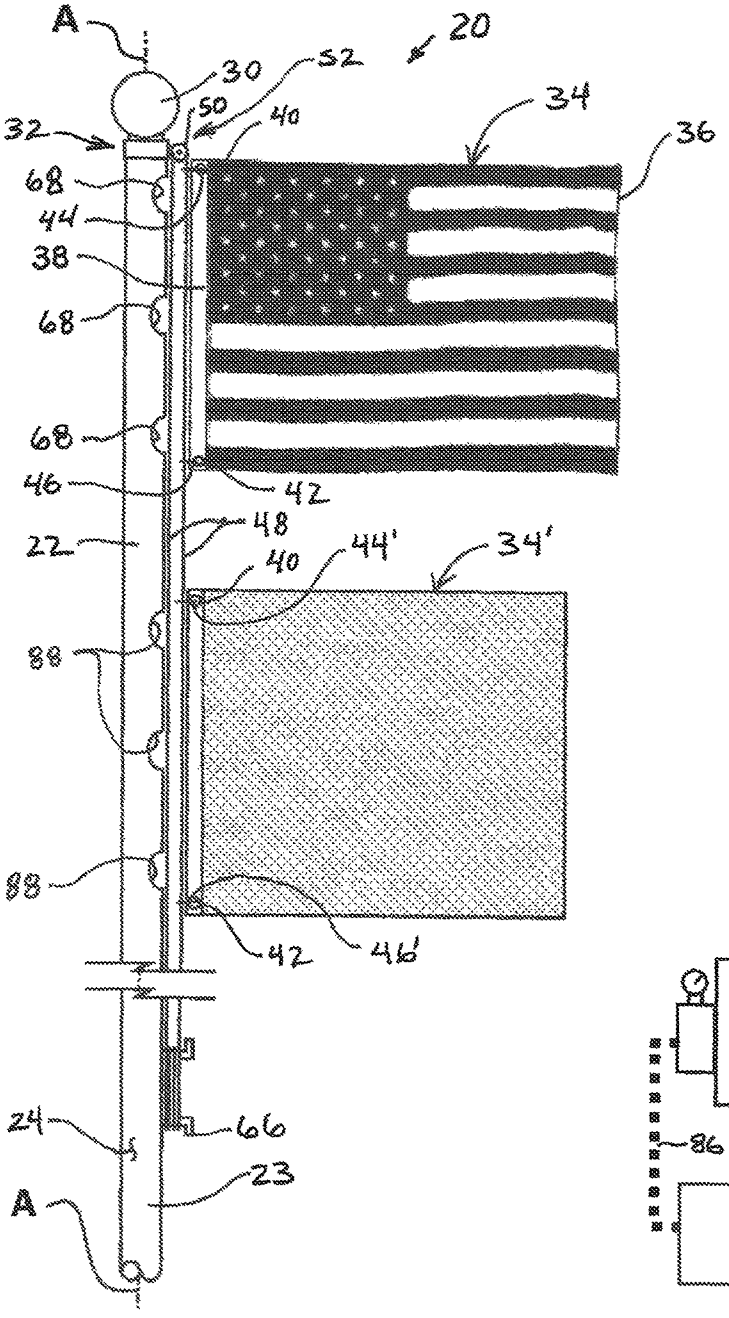
FIG. 5 is a fragmented side view of the vertically middle and upper portions of a fourth embodiment of a pneumatic flagpole according to the present invention having an external halyard system to which an example flag is attached, and a stationary truck that supports the halyard at a fixed radial position about the longitudinal axis of the flagpole's pole portion.

Certain embodiments of flagpole 20, such as that shown in FIG. 5, include an external halyard system, which is characterized by the entirety of the halyard being located exteriorly of the pole portion. In the depicted embodiment, the ends of halyard 48 are interconnected to form a continuous, or endless, loop that is located externally of pole portion 22. Upper snap hook 44 and lower snap hook 46 are securely attached to halyard 48, with the distance between upper and lower snap hooks 44, 46 substantially equivalent to the spacing between upper and lower grommets 40, 42 of attachable flag 34. Upper and lower snap hooks 44, 46 are respectively received through flag upper and lower grommets, 40, 42 as described above, whereby flag 34 is attached to and moveable with halyard 48. Halyard 48 of the depicted embodiment rides on vertically-oriented pulley 50, which is rotatably supported by truck 52 mounted to pole portion top end 32. In the flagpole embodiment shown in FIG. 5, truck 52 is stationary, and mounted to pole portion top end 32 in a rotatably fixed position; it does not rotate about axis A. Finial 30 is positioned on axis A and attached to truck 52.

In the flagpole 20 embodiment shown in FIG. 5, cleat 66 is affixed to pole portion exterior wall surface 24 at a location that is both accessible to an operator and vertically lower than positions at which attached flag 34 would be flown. In a manner known, to those having ordinary skill in the relevant art, halyard 48 is typically wound by the operator about cleat 66 and tied fast to secure the selected vertical position of flag 34.

Interior space 26 and the ambient air located about the exterior of pole portion 22, are in fluid communication via one or more pluralities of apertures 68. Each plurality of apertures 68 is located vertically between upper and lower snap hooks 44, 46, by which flag 34 is attached to flagpole 20 and vertically positioned relative to pole portion 22, directly (see FIGS. 1 and 2) or via halyard 48 (see FIGS. 4 and 5). Further, although each aperture 68 may be a punched or cut hole of uniform size and shape, in certain embodiments of flagpole 20 a plurality of apertures 68 may be holes of different sizes and shapes, and/or provided by orifices in fittings (not shown) received into the holes.

Moreover, in certain embodiments of flagpole 20, each plurality of apertures 68 includes a vertically distributed array of discrete, singular apertures 68 which are substantially radially aligned with each other and, in some embodiments, with snap hooks 44, 46 affixed to pole portion 22 as shown, for example, in FIGS. 1 and 2. Pressurized air that exits interior space 26 via each aperture 68 flows into the ambient airspace in which attached flag 34 is located, as a single high speed airflow stream, over or onto flag 34, causing the flag to fly.

In certain such embodiments of flagpole 20, each plurality of apertures 68 includes a vertically distributed array of circumferentially-spaced pairs of apertures 68 in pole portion 22, the positions of these pairs substantially aligned along axis A. Pressurized air exits interior space 26 through the arrayed pairs of apertures and flows into the ambient airspace as generally parallel, vertically spaced, high speed airflow streams, onto and/or over attached flag 34.

In certain embodiments of flagpole 20 depicted herein, pole portion 22 includes at least one plurality of vertically spaced apertures 68 located in the upper portion thereof, with each plurality of apertures 68 including three singular apertures 68, as shown in FIGS. 1, 2, 4 and 5. It is to be understood, however, that in other embodiments of flagpole 20, each plurality of apertures 68 may include a greater or lesser number of apertures 68.

In some embodiments of flagpole 20, each aperture 68 in a plurality of apertures is configured as a hole that is punched, cut or otherwise provided through pole portion wall 23 and extends between external wall surface 24 and internal wall surface 28. The hole may have a round, square, or other defined shape. In other embodiments, such a hole is receivable of one of a plurality of interchangeable fittings configured to provide apertures 68 of different sizes and/or orientations, to regulate the airflow characteristics and/or adjust the directions of pressurized air streams expelled from interior space 26 through apertures 68, as desired.

In certain embodiments of flag pole 20, a pair of circumferentially adjacent apertures 68 are provided, and the plurality of vertically spaced apertures includes a plurality of such pairs of apertures 68. The circumferentially adjacent apertures of each such pair of apertures 68 may be configured as a hole that is punched, cut or otherwise provided, as described above, In all depicted embodiments of flagpole 20, a plurality of apertures 68 directs its respective, high speed airflow streams over or onto attached flag 34, which is located in the ambient air space. The high speed airflow streams themselves, and/or ambient air displaced in response to the movement of these airflow streams, engages surfaces of flag 34, simulating a natural breeze flowing over flag 34. Thus, attached flag 34 is continually lifted and flown even during windless ambient conditions, regardless of whether flagpole 20 is erected in an indoor environment such as an auditorium, or enclosed stadium where ambient conditions are nearly always windless, or outdoors, where ambient wind conditions vary substantially.

In the embodiment of flagpole 20 shown in FIGS. 1 and 2, flagpole 20 includes a plurality of apertures 68 arranged in a single, vertically aligned array, the array itself disposed between and vertically aligned with snap hooks 11, 46 affixed to pole portion 22.

Referring to FIG. 2, in certain embodiments of flagpole 20, air inlet 70 in the form of at least one air inlet opening 72 extending through wall 23 of pole portion 22, places interior space 26 in fluid communication with ambient air. In the depicted embodiment, the bottom end of pole portion 22 is slidably disposed into a rigidly fixed ground sleeve (not shown) located below ground level. Inlet air opening 72 is spaced from the bottom end of pole portion 22 and exposed to ambient air.

At least one electrically-powered fan 74 is disposed within interior space 26 at a position vertically above opening 72. Ambient air is drawn by fan 74 into interior space 26 through opening 72. The air continuously received into interior space 26 and fan 74 is forced by the fan upwardly within pole portion 22, pressurizing the air within interior space 26. The pressurized air in interior space 26 is expelled through apertures 68 located in pole portion wall 23, thereby establishing a continuous, pressurized airflow through interior space 26. The pressurized air exits interior space 26 via apertures 68 as continuous airflow streams directed onto and/or over attached flag 34, causing the flag to fly. The amount of airflow through interior space 26 and the plurality of apertures 68 may be controlled through selection of the size and number of fans 74 and apertures 68 and/or the speed(s) of the fan(s) in a manner known in the relevant art.

Figure 3:
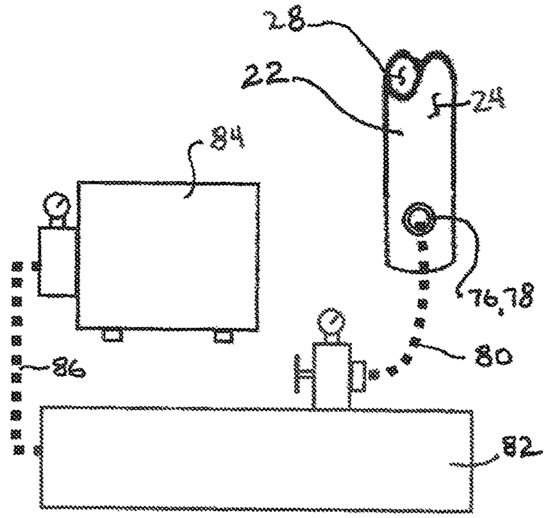
FIG. 3 is a schematic, fragmented view of the lower portion of a second, embodiment of a pneumatic flagpole according to the present invention, also showing the interior space of the flagpole's pole portion operably connected to an external source of pressurized air.

Referring now to FIG. 3, certain embodiments of flagpole 20 include air inlet 76 in the form of pneumatic hose fitting 78, to which first air conduit 80, such as a hose, is coupled. Pressurized air is delivered to interior space 26 through first air conduit 80 from the outlet of air storage tank 82. Air compressor 84 is fluidly coupled to the inlet of air storage tank 82 via second air conduit 86. Continuous, pressurized airflow is thus provided through interior space 26 and the plurality of apertures 68 to simulate a natural breeze flowing over attached flag 34 as described above. In the depicted embodiment, the amount of airflow through interior space 26 and the plurality of apertures 68, and onto and/or over attached flag 34, may be controlled by selection of the size, shape and number of the apertures and/or regulating the pressure of air delivered from air storage tank 82 to first air conduit 80 in a manner known in the relevant art.

Halyard systems of either external or internal type facilitate selective position a flag at various heights along the pole portion of the flagpole. Certain embodiments of flagpole 20 have at least one plurality of apertures 68 that is located only proximate the top of pole portion 22; in such an embodiment an attached flag 34 would be selectively hoisted and secured by an operator at the peak of flagpole 20 to facilitate pressurized airflow streams exiting interior space 26 via a plurality of apertures 68 to directly or indirectly engage and fly flag 34, as described above.

Certain embodiments of flagpole 20 having a first pair of upper and lower snap hooks 44, 46 either affixed to pole portion 22 (see FIGS. 1 and 2) or attached to halyard 48 (see FIGS. 4 and 5) include a second pair of upper and lower snap hooks 44', 46' that are also affixed to pole portion 22 or attached to halyard 48, respectively. In such embodiments, attached flag 34 may be a first attached flag 34, which is attached to upper and lower snap hooks 44, 46 and influenced by pressurized airflow streams discharged from at least one plurality of first apertures 68 as described above. Second pair of snap hooks 44', 46' is positioned adjacently below and in radial alignment with first pair of snap hooks 44, 46. In certain flagpole 20 embodiments, upper snap hook 44' of the second pair of snap hooks 44', 46' is located approximately one foot below lower snap hook 46 of the first pair of snap hooks 44, 46. Snap hooks 44' 46' of the second pair of snap hooks are receivable within the upper and lower grommets 40, 42 of second flag 34' attachable to pole portion 22 at a position radially aligned with the position at which first flag 34 is attached to the pole portion. In certain embodiments, the vertical spacing distance between second upper snap hook 44' and second lower snap hook 46' is identical to that between first upper snap hook 44 and first lower snap hook 46. These vertical spacing are different in other embodiments.

Some embodiments of flagpole 20 that include first and second pairs of upper and lower snap hooks 44, 46 and 44', 46' also include at least one plurality of second apertures 88 located between the second pair of snap hooks 44', 46' (see, e.g., FIG. 5). The plurality of second apertures 88 may be identical to, or different than, the plurality of first apertures 68 in their comparative aperture numbers, sizes and shapes, spacings therebetween, and radial positions. Such embodiments of flagpole 20 thus provide the above-described flag-flying capabilities of the present invention to attached second flag 34' in addition to attached first flag 34.

The embodiment of flagpole 20 shown in FIG. 5 includes a stationary truck 52 that positions its pulley 50 at a fixed radial location about axis A, and substantially maintains halyard 48 and attached flag 34 at a fixed radial orientation relative to pole portion 22 at, the various flag heights. In embodiments having an external halyard system, the rotatably fixed position of pulley 50 relative to axis A is radially aligned with external cleat 66, a single plurality of vertically-arrayed first apertures 68, and a single plurality of vertically-arrayed second apertures 88, with each plurality of apertures 68, 88 distributed in a respective, vertical array.

"Half-mast" is a style of flag display where the attached flag is flown at least the width of the flag between the top of the flag and the top of the flagpole, which in some embodiments can be achieved by merely adjusting halyard 48 to lower attached flag 34 into a position in which flag hoist end 38 is substantially aligned axially with the plurality of second apertures 88. Certain embodiments of flagpole 20 include either an internal or an external halyard system that includes halyard 48 to which flag 34 is attached via upper snap hook 44 and lower snap hook 46 as described above and shown in FIGS. 4 and 5. Such embodiments further include at least one plurality of first apertures 68, and at least one plurality of second apertures 88 located vertically below first apertures 68 (see, e.g., FIG. 5). Second apertures 88 may be of a number, size, vertical interspacing, and radially position that is identical to, or different than, those of first apertures 68. With the pluralities of first and second apertures 68 and 88 suitably matched and vertically spaced from each other, such embodiments of flagpole 20 can be made capable of flying selfsame attached flag 34 under the influence of pressurized air streams expelled from interior space 26 at half-mast through suitably-positioned second apertures 88, with characteristics similar to those when flown at peak.

Certain embodiments of flagpole 20 are envisioned to be most commonly used with internal halyard systems and erected outdoors, where attached flag 34 would often fly under prevailing natural winds from different directions, include multiple pluralities of circumferentially distributed apertures 68. In some instances, the force of such prevailing winds can overcome the induced, simulated breeze induced by flagpole 20. Certain such embodiments include a rotatable truck 52, which facilitates freedom of movement of halyard 48 and flag 34 about pole portion 22 in response to the prevailing wind regardless of wind direction.

When the prevailing winds die, attached flag 34 can come to rest in its last angular position about pole portion 22. Were but a single plurality of linear, vertically-arrayed apertures 68 provided, halyard 48 and hoist end 38 of flag 34 could then be substantially radially misaligned with apertures 68, and pressurized airflow expelled from interior space 26 via apertures 68 might then not engage attached flag 34 directly or indirectly, in which case the expelled air streams could not cause flag 34 to fly. An operator might then be required to manually reposition halyard 48 and attached flag 34 into operable radial alignment relative to apertures 68.

Figure 4A:
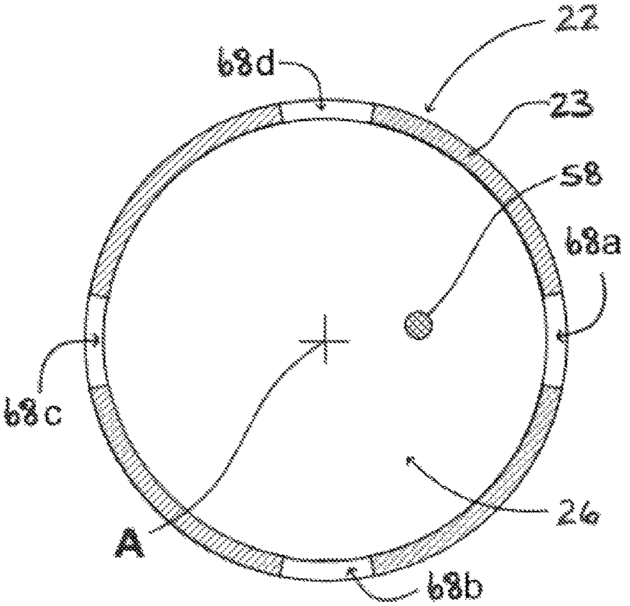
FIG. 4A is an enlarged, axial cross-sectional view taken along any of lines 4A-4A of FIG. 4.

Referring to FIG. 4A, certain embodiments of flagpole 20 provide in pole portion 22 multiple, circumferentially spaced pluralities (e.g., 68*a*, 68*b*, 68*c*, 68*d*) of axially distributed, vertically-arrayed apertures 68 that allow attached flag 34 to continue flying after the prevailing wind dies, regardless of the resulting angular position flag 34 assumes about pole portion 22. As depicted in FIG. 4A, pluralities 68*a* and 68*c* are located on radially opposite sides of pole portion 22, and pluralities 68*b* and 68*d* are located on radially opposite sides of pole portion 22. Certain embodiments of flagpole 20 similarly include multiple, circumferentially spaced pluralities of axially distributed, vertically-arrayed second apertures 88 located vertically below multiple, circumferentially spaced pluralities of axially distributed, vertically-arrayed first apertures 68. The four pluralities of axially distributed, vertically-arrayed apertures 68 depicted in FIG. 4A, i.e., arrays 68*a*, 68*b*, 68*c* and 68*d*, are distributed substantially equidistantly from each other about the circumference of pole portion 22. It is to be understood, however, that in some embodiments of flagpole 20, certain pairs of vertically adjacent apertures 68 within such an array may be substantially closer to each other than other pairs of vertically adjacent apertures 68, as shown in FIG. 4, to provide more or less airflow over certain portions of attached flag 34, if necessary.

Figure 6:
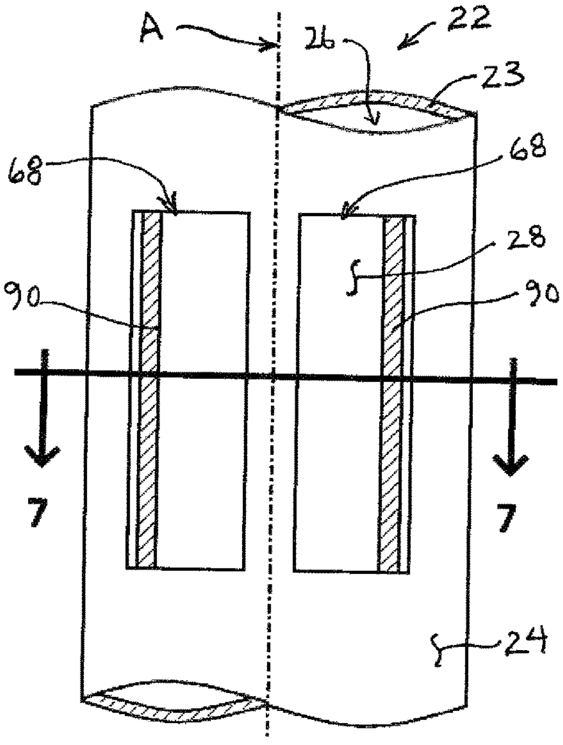
FIG. 6 is a partial side view of the upper portion of a fifth embodiment of a pneumatic flagpole according to the present invention in which a pair of apertures is formed by cutting tabs into the cylindrical wall of the pole portion and bending the tabs radially outwardly, so as to direct pressurized airflow expelled from the interior space onto and/or over a flag attachable to the flagpole at a position circumferentially between the pair of tabs.
Figure 8:
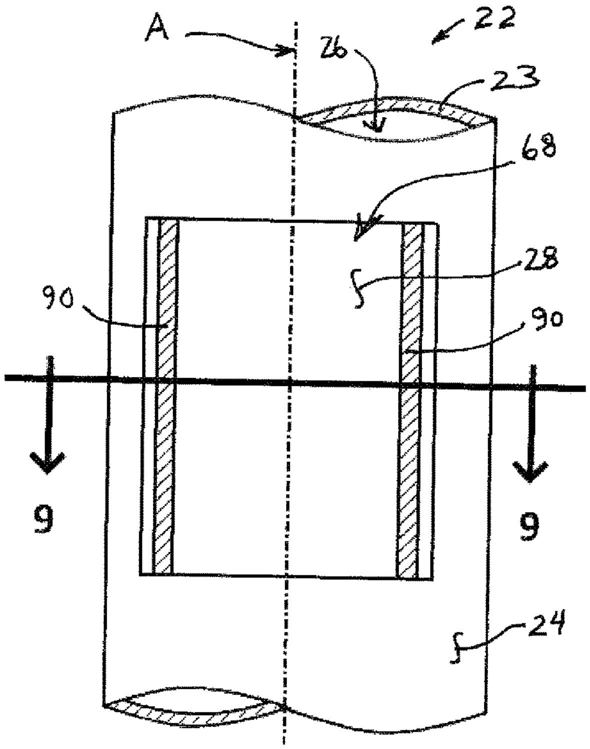
FIG. 8 is a partial side view of the upper portion of a sixth embodiment of a pneumatic flagpole according to the present invention in which a single aperture is formed by cutting tabs into the cylindrical wall of the pole portion and bending the tabs radially outwardly, so as to direct pressurized airflow expelled from the interior space onto and/or over a flag attachable to the flagpole at a position circumferentially between the pair of tabs.
Figure 7:
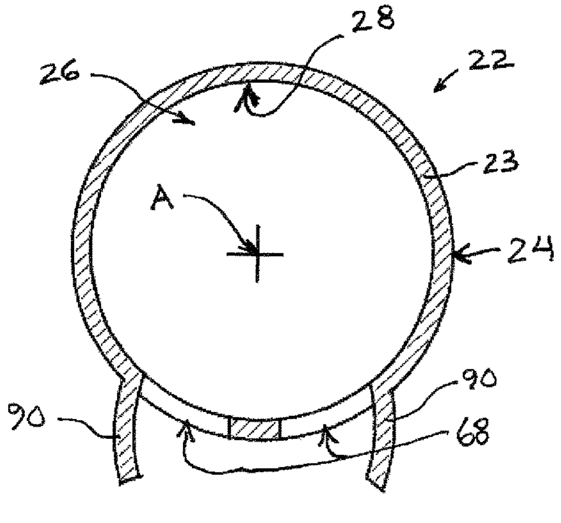
FIG. 7 is a cross-sectional view taken along line 7-7 of FIG. 6.
Figure 9:
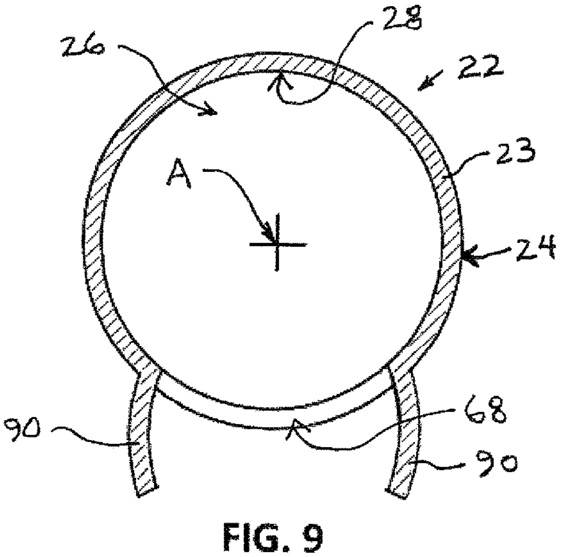
FIG. 9 is a cross-sectional view taken along line 9-9 of FIG. 8.

The shapes and sizes of the plurality of apertures may be uniform, or differ from each other to tailor the air impingement effect upon flag 34. The apertures may be through holes in the substantially cylindrical wall 23 of pole portion 22 itself, or in fittings disposed within such holes. Two example embodiments of flagpole 20 so tailored are shown in FIGS. 6-9. FIGS. 6 and 7 show an embodiment in which wall 23 of pole portion 22 is cut and plastically deformed to provide a pair of circumferentially adjacent rectangular apertures 68, the circumferentially outer edges of which are provided with a pair of tabs 90 that are integrally connected to wall 23 and extend radially outward toward hoist end 38 of attached flag 34, which is radially aligned with axis A and the space between tabs 90. Pressurized airflow expelled through the pair of apertures 68 is directed by the interfacing sides of tabs 90 onto and/or over the surfaces of attached flag 34. FIGS. 8 and 9 show an embodiment of flagpole 20 provided with a single aperture 68 having a pair of tabs 90 integrally connected to wall 23, and which are formed and function similarly. Moreover, it is envisioned that in certain unshown embodiments, a narrow, vertically extending slot of uniform or varying width may be substituted for a plurality of apertures.

While this invention has been described as having preferred designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which, this invention pertains and which fall within the limits of the appended claims.

What is claimed is:

1. A pneumatic flagpole to which a vertically oriented flag is selectively attachable, said flagpole comprising:

a vertically elongate wall circumferentially surrounding an elongate interior space through which air flows vertically upward, said wall having an exterior wall surface over which is positioned a flag selectively attached to the flagpole; and wherein said wall is provided with a plurality of vertically-spaced apertures, each of said apertures extending between the interior space and the exterior wall surface, and the selectively attached flag is positioned adjacent to the plurality of vertically-spaced apertures, the selectively attached flag engaged by air expelled from the interior space through the plurality of vertically-spaced apertures, whereby the flag is caused to fly;

wherein one aperture of said plurality of vertically-spaced apertures has a circumferentially outer edge bounded by a tab extending outwardly from the exterior wall surface, said tab is integrally connected to the vertically elongate wall along the circumferentially outer edge of said one aperture, and air expelled from the interior space through said one aperture is directed by said tab onto and/or over the selectively attached flag;

wherein said circumferentially outer edge of said one aperture is a first circumferentially outer edge and said tab is a first tab, said one aperture has a second circumferentially outer edge bounded by a second tab extending outwardly from the exterior wall surface, said second tab is integrally connected to the vertically elongate wall along the second circumferentially outer edge of said one aperture, and air expelled from the interior space through said aperture is directed by said first tab and said second tab onto and/or over the selectively attached flag; and wherein said one aperture of said plurality of vertically-spaced apertures extends continuously between said first circumferentially outer edge and said second circumferentially outer edge.

2. The pneumatic flagpole of claim 1, wherein the selectively attached flag is connected to said flagpole at vertically-spaced locations along the flag's hoist end, the hoist end of the selectively attached flag positioned circumferentially between said first tab and said second tab.

3. The pneumatic flagpole of claim 2, further comprising a pulley disposed proximate a top end of the flagpole and a halyard extending over the pulley, the pulley located between first and second segments of the halyard, the first and second segments of the halyard extending along the vertically elongate wall, the flag selectively attached to the first or the segments of the halyard and selectively positioned adjacent the plurality of vertically-spaced apertures through movement of the halyard.

4. The pneumatic flagpole of claim 2, further comprising a vertically spaced pair of snap hooks affixed to the exterior wall surface, the plurality of vertically-spaced apertures circumferentially aligned with and disposed between the pair of snap hooks.

5. The pneumatic flagpole of claim 1, wherein a vertically elongate, integrally connected portion of the vertically elongate wall is disposed circumferentially between said first circumferentially outer edge and said second circumferentially outer edge of said one aperture of said plurality of vertically-spaced apertures.

* * * * *